SEARCH ROOM

March 3, 1970 T. KIRBY 3,498,696

OPTICAL APPARATUS FOR VIEWING THE SCREEN OF A TELEVISION RECEIVER FROM THE REAR THEREOF

Filed Nov. 8, 1965

INVENTOR

Truman Kirby

BY Shoemaker and Mattare

ATTORNEY 3,498,696

OPTICAL APPARATUS FOR VIEWING THE SCREEN OF A TELEVISION RECEIVER FROM THE REAR THEREOF

Truman Kirby, 1600 W. 10th St., Panama City, Fla. 32401
Filed Nov. 8, 1965, Ser. No. 506,688
Int. Cl. G02b 17/00, 23/08
U.S. Cl. 350—202 1 Claim

ABSTRACT OF THE DISCLOSURE

A portable viewing device for use while adjusting television sets comprising a housing including two straight tubular portions arranged in a common plane and joined to provide a right angular relationship. An opening is provided in the wall of each portion adjacent its free end, one facing the right angle area defined by said portions and the other facing opposite said area. A mirror is positioned therein opposite each of said openings and at the angle juncture of the portions. The line of sight defined by the three mirrors is coincident with the axis of the tubular portions wherein a ray of light entering one opening will be reflected from the other opening.

Figures 1, 2:
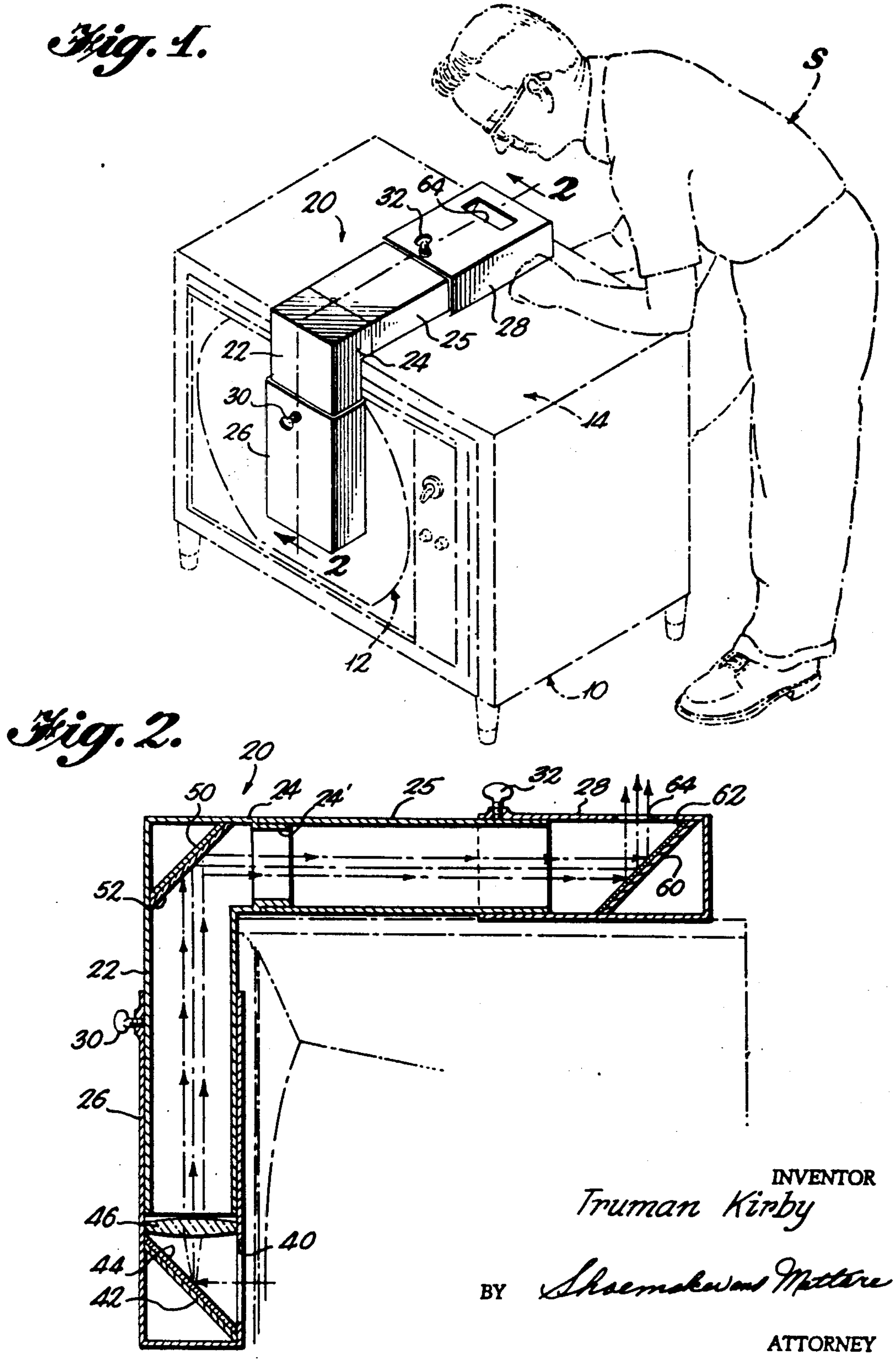

The present invention relates to new and novel apparatus for use in adjusting television sets, and more particularly to apparatus which permits a serviceman to remain at the rear portion of a television set and to readily observe the screen of the set while making suitable adjustments thereto.

The present invention may be employed when making various types of adjustments to television sets. For example, it may be employed in making static-convergence adjustments and dynamic-convergence adjustments in color television sets. It may also be used for adjusting the focus of television scanning lines in both color and black and white television sets. The apparatus may further be employed when making any other type of adjustments which are normally made at the rear of the television set and wherein it is further necessary or desirable to view the screen of the television set for accomplishing the proper adjustments. For example, the present invention may be employed for making bias adjustments, green drive, blue drive and red drive adjustments in color television sets, and also for making red screen, green screen and blue screen adjustments in color television sets.

The present invention is particularly useful in making static convergence adjustments of color television sets. At the present time, these adjustments are normally made while the repairman stands at the rear portion of the television set, and the repairman adjusts the color convergence magnets located on the neck of the picture tube while observing the results of his adjustments as reflected from a mirror which is generally either propped up at some distance from the screen of the set, or which may in some instances be held in the hand of the repairman. In either case, the mirror is disposed at an awkward angle, and it is difficult to detect and correct small static-convergence errors, especially blue errors, since the repairman may be observing the mirror from an awkward angle and further cannot usually continuously observe the mirror so that a trial and error process must be employed with the repairman observing the mirror from time to time.

These disadvantages are overcome in the present invention by providing an arrangement wherein the apparatus provides a viewing area which is disposed immediately beneath the repairman's eyes at the top rear portion of the television set while he is in position to make the required adjustments. The apparatus of the present invention is so positioned as to provide an undistorted view to the repairman, and further, magnifying means is provided for enlarging the image and providing the repairman with an even clearer and more detailed view than would be normally available. In addition, the apparatus of the present invention enables the repairman to continuously observe the results of his adjustments so that the adjustments can be made in a minimum amount of time and further wherein such adjustments may be made with great accuracy so as to provide the best possible end results.

The present invention is also particularly useful in making dynamic-convergence adjustments. In making such adjustments of color television sets, it is necessary to converge all three beams of color at every point on the screen, involving control of the amplitude and tilt of parabolic current waveforms applied to all three electric beams. In the procedures now employed for making dynamic-convergence adjustments, it is necessary to remove the dynamic-convergence service panel from the television set and to place it in service position at the upper portion of the set. This service panel must then be placed back in the set on completion of such adjustments. In the present invention, it is not necessary to remove this service panel, and accordingly, considerable time and effort is saved in making these adjustments.

The present invention also enables the serviceman to make quicker, clearer and sharper focus adjustments of the pictures on the screens of both color and black and white television sets. This is possible due to the fact that the serviceman may continually observe the results of the adjustments and further since the reflecting and magnifying means of the apparatus of the present invention provides a very clear and sharp reflection so that the serviceman obtains an accurate view of the results of the adjustments.

The same advantages as discussed above are obtained when making any other type of adjustment at the rear of the set wherein it is necessary or desirable to view the screen of the set to make such adjustments.

The apparatus of the present invention also includes movable adjustable portions so that the apparatus may be employed with sets of different size, and further wherein suitable adjustments may be made for viewing the entire screen of the television set if so desired.

An object of the present invention is to provide new and novel apparatus for use in adjusting television sets which is especially adapted for use when making adjustments at the rear of the set and wherein it is necessary or desirable to view the screen of the set in order to make proper adjustments.

Another object of the invention is the provision of apparatus for providing a continuous view of the screen of the set while the serviceman is standing at the rear of the set.

Still another object of the invention is to provide apparatus which enables adjustments of television sets to be made much more quickly and with greater accuracy so as to provide a clearer and sharper picture.

Yet another object of the invention is the provision of apparatus which enables dynamic-convergence adjustments to be made on color television sets without the necessity of removing the dynamic-convergence service panel from the set.

A further object of the invention is to provide apparatus for use in adjusting television sets and wherein certain movable adjustable portions are provided in the apparatus so that various portions of the screen may be observed.

A still further object of the invention is to provide apparatus for use in adjusting television sets which is quite simple and inexpensive in construction, and yet which at the same time is quite efficient and reliable in use.

Other objects and many attendant advantages of the invention will become more apparent when considered in connection with the specification and accompanying drawings, wherein:

FIG. 1 is a top perspective view illustrating the apparatus of the present invention as disposed in operative relationship with respect to a television set; and FIG. 2 is a sectional view taken substantially along line 2—2 of FIG. 1 looking in the direction of the arrows.

Referring now to the drawing wherein like reference characters designate corresponding parts throughout the several views, there is illustrated in FIG. 1 a conventional television set as shown in phantom lines and as indicated by reference character 10. This television set may be of the usual construction and includes a viewing screen 12 at the front thereof and an upper cabinet surface 14 which comprises the top of the tlevision set.

The apparatus of the present invention is illustrated generally by reference numeral 20, this apparatus comprising a body means including first and second portions which are angularly related to one another. As seen most clearly in FIG. 2, the first body portion includes a tubular part 22 of generally rectangular cross sectional configuration which extends substantially perpendicularly to a similar tubular body portion 24, portion 22 being normally disposed in vertical position when in use, and portion 24 normally being disposed in horizontal position. The horizontally extending body portion 24 includes a portion 24' of reduced dimension and a further tubular portion 25 which is adapted to have a snug fit with the outer surface of reduced portion 24'. Member 25 may be removed when shipping the apparatus or when storing it so that the apparatus will occupy a minimum of space when not in use. It is apparent that the apparatus may be readily assembled simply by sliding member 25 into the operative position shown in FIG. 2.

The first body portion comprises the portion 22 previously described and a complementary tubular portion 26 which telescopes over portion 22. The second body portion includes the previously described portions 24 and 25 and a complementary tubular portion 28 which telescopes over member 25. A suitable locking means such as a screw 30 is threaded through a suitable hole provided in member 26 and is adapted to engage the outer surface of portion 22 for holding portion 26 in a desired adjusted position. In a similar manner, a screw 32 is threaded through a suitable hole provided in portion 28 and is adapted to engage the outer surface of member 25 for holding portion 28 in a desired operative position.

The body portion 26 includes at the lower inner face thereof a rectangular shaped opening 40 which in a typical example may have a dimension of approximately 2½" by 4½". The light rays may enter through this opening 40.

A wall portion 42 supports a first reflecting means or mirror 44 at an angle of approximately 45 degrees to the longitudinal axis of body portions 22 and 26, whereby it is apparent that light rays entering through opening 40 in a generally horizontal direction will be reflected upwardly within the body means in a generally vertical direction.

A suitable magnifying lens 46 is supported within body portion 26 in fixed spaced relationship to mirror 44 for magnifying the image reflected by this first reflecting means.

A wall portion 50 is provided at the point of angular interconnection of the two body portions 22 and 24 and supports a second reflecting means or mirror 52, this mirror being disposed in such a plane as to extend at a 45 degree angle to the longitudinal axes of each of the body portions 22 and 24. It will also be noted that mirror

52 lies in a plane which extends substantially perpendicular to the plane of mirror 44 previously described.

A wall portion 60 is provided in the body portions 28 and supports a third reflecting means or mirror 62 which is disposed in a plane substantially parallel to that of mirror 52. It is apparent that light rays passing in a generally vertical direction within body portion 22 will be reflected from mirror 52 in a generally horizontally extending direction, and that such light rays will in turn be reflected by mirror 62 upwardly in a general vertical direction.

The light rays reflected upwardly from mirror 62 will pass outwardly through an opening 64 provided in the upper surface of body portion 28. The serviceman as seen in FIG. 1 and as indicated by reference numeral S may conveniently stand at the rear of the television set so that his hands are readily available for making the adjustments at the rear portion of the set while his eyes are disposed directly over the opening 64 so as to view the image reflected by mirror 62. In a typical example, this viewing opening 64 may have a dimension of approximately 1 inch by 4½".

It is apparent from the foregoing that there is provided according to the present invention new and novel apparatus for use in adjusting television sets. This apparatus may be used for making any type of adjustment and particularly where the adjustment is to be made at the rear of the set and wherein it is necessary or desirable to view the screen of the set in order to make a proper adjustment. The apparatus provides a continuous view of the results of the adjustment while the serviceman is standing at the rear of the set and making such adjustment. This arrangement enables the adjustments to be made much more quickly, and further much more accurately due to the fact that a continuous picture is provided and further since a magnified sharp and clear view is provided for the serviceman. It is not necessary to remove the dynamic-convergence service panel from color television sets when utilizing apparatus of the present invention, and the adjustable portions of the apparatus enable it to be readily employed with television sets of different dimensions and the portion 26 in particular may be adjusted so as to view different portions of the television screen. The apparatus is quite simple and inexpensive in construction, and yet at the same time is quite efficient and reliable in use.

As this invention may be embodied in several forms without departing from the spirit or essential characteristics thereof, the present embodiment is therefore illustrative and not restrictive.

I claim:

1. A portable device for use in adjusting television sets comprising a housing, rectangular in cross section having a vertical portion and a horizontal portion connected together at one of their ends and forming a continuous planar passage from substantially the free end of one portion to substantially the free end of the other portion, said portions having inner and outer side walls joined respectively in right angular relationship, the free end of said inner side wall of said vertical portion having a first opening completely traversing said wall and intended to face a television screen, first reflecting means supported in said vertical portion and being positioned opposite said first opening to receive light rays passing through said first opening and reflect them through the vertical portion, a second reflecting means disposed within the area of angular interconnection of said vertical and horizontal portions and being positioned to receive said light rays reflected from said first reflecting means and reflect them through the horizontal portion, the free end of said outer side wall of said horizontal portion having a second opening facing upwardly, and a third reflecting means supported in said horizontal portion and disposed opposite said second opening to receive light rays reflected from said second reflecting means, and to reflect such light rays through said second opening, magnifying means supported in said first tubular portion intermediate said first reflecting means and said third reflecting means for magnifying an image reflected by said first reflecting means to provide an enlarged image as viewed through said second opening, the line of sight being defined by the three reflecting means being coincident with the axes of the housing, thereby enabling a serviceman to look into said second opening and view what is taking place on a television screen.

References Cited

UNITED STATES PATENTS

| | | | |
|---|---|---|---|
| 1,644,902 | 10/1927 | Voigt | 350—202 |
| 2,182,651 | 12/1939 | Wilson et al. | 350—25 |
| 2,551,243 | 5/1951 | Campbell | 350—202 |
| 2,985,749 | 5/1961 | Johnson | 350—301 |

FOREIGN PATENTS

| | | |
|---|---|---|
| 725,806 | 9/1942 | Germany. |

DAVID SCHONBERG, Primary Examiner

RONALD J. STERN, Assistant Examiner

U.S. Cl. X.R.

178—6, 7.88; 350—301